UNITED STATES PATENT OFFICE.

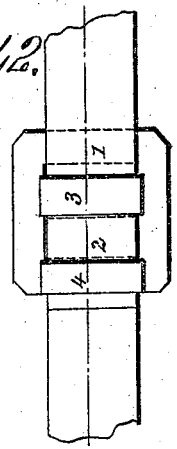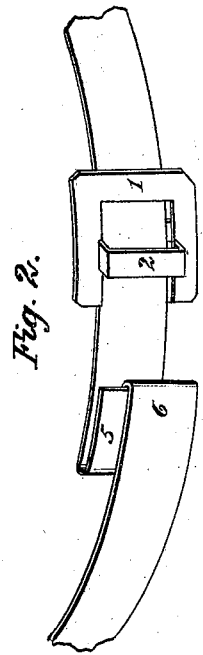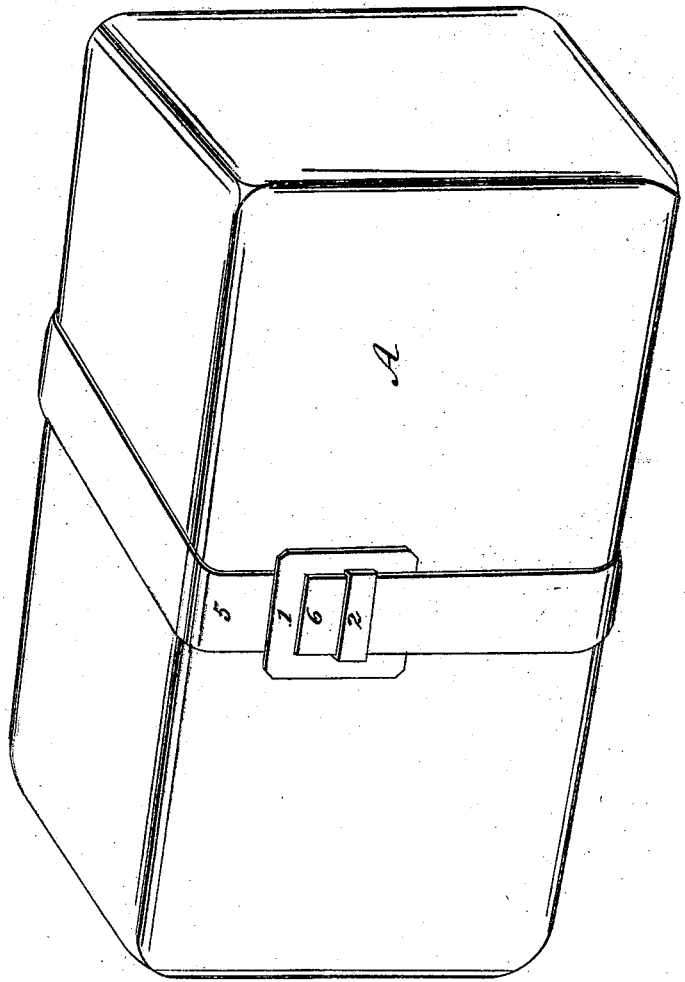
H. McComb,
Cotton Bale Tie.
No. 15,142.
Patented June 17, 1856.

D. McCOMB, OF MEMPHIS, TENNESSEE.

IMPROVEMENT IN NON-ELASTIC BANDS FOR BALES OF COTTON AND OTHER FIBROUS MATERIALS.

Specification forming part of Letters Patent No. 15,142, dated June 17, 1856.

*To all whom it may concern:*

Be it known that I, DAVID McCOMB, of Memphis, in the county of Shelby and State of Tennessee, have invented a new and Improved Mode of Fastening Iron Hoops or Bands on Hay, Hemp, or Cotton Bales or other Packages; and I do hereby declare that the following is a full and exact description thereof, reference being had to the accompanying drawings and the figures of reference marked thereon.

The nature of my invention consists in preparing hoop-iron or other metal hooping so as to make it of easy application in baling cotton or other fibrous matter.

To enable any one skilled in iron work and baling hay, hemp, or cotton to make and use this method of fastening the iron hoop, I will describe its construction more fully.

I cut the hoop to any desired length, and then form a hook on each end of it, as shown by 5 and 6 in Figure 2 of the drawings attached, making the points of the hooks fit closely the bend, and making the hook about the width of the iron used in length. Over these hooks, when put together, I put a flat link or slide, which secures the hooks from opening, when the pressure of the bale is applied, on the removal of the compressing power. This link or slide is made of thin hoop-iron cut and formed with dies, so as to make it of easy application and sufficient strength to secure the hoops fully. For the form of this slide reference may be had to Fig. 3, which exhibits the under side of the slide, or the side which goes next to the bale. Figures 1 and 2 in Fig. 2 exhibit the other or outside of the slide, which is so constructed that figure 1 serves as a guard to prevent the slide from dropping down too far when applied in baling. Fig. 1 exhibits the hoop applied to the bale A, with the guard of the slide resting on the outer hook on 6, or the lower part of the hoop. Fig. 4 exhibits a sectional view of the tie complete, from which it will be seen that the guard 1 lies close to the upper end of the hoop, while 2, 3, and 4 are made open enough to receive four thicknesses of the hoop-iron. This arrangement of the slide secures it from being lost off the hoop after the hooks are turned on the ends of it, as well as prevents the slide from dropping too far down when applying the hoop to bales, and is of great importance.

With this improved tie bales are made much more rapidly than with rope, and are kept in very much better condition, as well as greatly more secure from destruction by fire or damage by water.

What I claim as my invention, and desire to secure by Letters Patent, is—

1. The combination of the link or slide with the hooked ends of hoops for the purpose of securing them from opening with the expansive force of the bale.

2. The peculiar formation of the link, as exhibited in Figs. 2 and 3, which forms a secure means of keeping the hooked ends of the hoop together, and has a guard which keeps it to its place, is easy of application in putting on, and may be removed at pleasure without mutilation.

DAVID McCOMB.

Witnesses:
HENRY JANNY,
JOSEPH SCHOLFIELD.